United States Patent [19]

Ratkowski

[11] Patent Number: 4,582,884
[45] Date of Patent: Apr. 15, 1986

[54] LENS COMPOSITION, ARTICLE AND METHOD OF MANUFACTURE

[75] Inventor: Donald J. Ratkowski, Mesa, Ariz.

[73] Assignee: Paragon Optical, Inc., Mesa, Ariz.

[21] Appl. No.: 646,069

[22] Filed: Aug. 31, 1984

[51] Int. Cl.[4] .............................................. C08F 30/08
[52] U.S. Cl. ..................................... 526/279; 528/32; 351/160 R
[58] Field of Search .......................... 526/279; 528/32; 351/160 R

[56] References Cited

U.S. PATENT DOCUMENTS

| | | | |
|---|---|---|---|
| 3,808,178 | 4/1974 | Gaylord | 556/454 |
| 4,136,250 | 1/1979 | Mueller et al. | 528/29 |
| 4,139,692 | 2/1979 | Tanaka et al. | 526/279 |
| 4,216,303 | 8/1980 | Novicky | 526/279 |
| 4,235,985 | 11/1980 | Tanaka et al. | 526/279 |
| 4,330,383 | 5/1982 | Ellis et al. | 526/279 |
| 4,419,505 | 12/1983 | Ratkowski et al. | 526/279 |

*Primary Examiner*—Melvyn I. Marquis
*Attorney, Agent, or Firm*—Richard R. Mybeck

[57] ABSTRACT

A copolymer composition, especially suited for fabricating optical lenses comprising a copolymer of copolymerized comonomers which include about one to about 25 percent by weight of an acryloxyalkylsilanol; about 0.5 to about 15 percent by weight of a polyacryloxyalkylpolysiloxane; about 5 to about 60 percent by weight of an siloxy substituted ester of acrylic or methacrylic acid; and from about 35 to about 90 percent by weight of an acrylic or methacrylic ester of an alkanol having from one to twenty carbon atoms.

Contact lenses and contact lens buttons are formed of such copolymer of copolymerized comonomers by conventional techniques, by injection molding, and by compression molding.

25 Claims, No Drawings

LENS COMPOSITION, ARTICLE AND METHOD OF MANUFACTURE

The present invention relates to new and unique copolymer compositions, methods for handling said copolymers to mold or cast them into optical lenses, especially contact lenses or blanks from which contact lenses may be shaped, and to the buttons and lenses resulting therefrom.

More particularly, the present invention relates to novel copolymer compositions having distinctly improved wettability, mechanical stability and optical clarity from which greatly improved optical lenses including interoccular and contact lenses, or the buttons and blanks from which such lenses may be shaped, are formed by either conventional forming techniques, by injection molding or by compression casting; and to the shaped lenses, blanks and buttons created therefrom.

Furthermore, this invention concerns oxygen-permeable copolymers which have improved wettability and mechanical stability, which can be used to manufacture contact lenses by industry-standard manufacturing techniques and also by injection molding or casting, which lenses can be cleaned with standard hard and soft contact lens cleaning solutions and do not require special surface treatments to impart wettability. For purposes of the following discussion, this invention will be described in terms of contact lenses although it is readily applicable to various optical lenses and applications.

So-called "hard" contact lenses and compositions for fabricating them are well known in the art. The standard contact lens used for many years is fabricated from polymethyl methacrylate (PMMA) and has achieved widespread use throughout the world, despite the fact that the PMMA lenses are essentially impermeable to oxygen. The lack of oxygen at the interface between the contact lens and the cornea will, after short periods of time, even less than one day, cause discomfort to the wearer because of edema induced by the lack of oxygen at the surface of the cornea. Consequently, PMMA lenses must be removed at least daily and preferrably more often to expose the surface of the cornea to ambient atmospheric oxygen and thereafter replaced, a bothersome procedure.

In an attempt to remedy these defects inherent in standard PMMA contact lenses, the art has devised other copolymer contact lens compositions having improved oxygen-permeability which allow the user to wear the lenses for longer periods of time, upwards of several days, before they must be removed for cleaning. These oxygen-permeable lenses are of two general types, the so-called "soft" lens formed of the very flexible Hydrogel ® material and the so-called "hard permeable" lens formed of a solid copolymer of polymethyl methacrylate with various comonomers. The hard permeable lenses avoid certain problems associated with the so-called soft lens, principally in their resistance to contamination and breakage, their ease of cleaning and their resistance to surface scratching.

Although the hard permeable contact lens compositions do represent a marked improvement over standard PMMA polymers in terms of oxygen-permeability, they nevertheless suffer certain disadvantages in comparison to standard PMMA lenses in terms of wettability, mechanical stability and chemical stability. Moreover, certain of the present hard permeable copolymers require special surface pre-treatment to improve wettability and/or special lens treatment solutions which are used throughout the life of the lens to improve or maintain surface properties. Furthermore, the hard permeable copolymers are inherently brittle with the result that they frequently chip at their edges and break. Such chipping obviously creates a potential health hazard to the wearer and imposes a definite economic burden because they must be replaced.

Accordingly, a definite need exists for and it would be highly advantageous to provide a hard oxygen-permeable contact lens composition, lenses manufactured thereof, and methods for manufacturing lenses or lens blanks (buttons) therefrom, all of which could provide contact lenses having at least the oxygen-permeability characteristic exhibited by presently available hard permeable lenses, which would have improved wettability, and which would provide significant production economies, especially if such composition can be used to manufacture contact lenses or buttons therefor, using not only the standard procedures and equipment already known for manufacture of PMMA lenses, but using injection molding or casting in such a way that special surface pre-treatments or periodic surface treatments to attain and maintain the desired surface properties are no longer required.

I have now discovered lens copolymer compositions, lenses fabricated therefrom and methods for manufacture of lenses employing such compositions which achieve these desired objectives in a remarkably unexpected fashion as will be readily discerned from a detailed reading of the following disclosure and examples thereof.

Briefly stated, the composition of the present invention comprises a copolymer derived from comonomers which include a methacryloxyalkylsilanol; a di(methacryloxyalkyl)polysiloxane; a tris(trialkylsiloxy)methacryloxyalkylsilane and an alkyl methacrylate. The corresponding acrylic acid esters may be used for any of the foregoing components. In the preferred composition, acrylic or methacrylic acid will be used as a wetting agent and, a polyfunctional ester, derived from the reaction of acrylic or methacrylic acid with an aliphatic di- or polyol (e.g. ethylene glycol, glycerol and the like), will be used as a crosslinker.

The invention also provides, as new articles of manufacture, lenses fabricated from these copolymers and new methods of manufacturing lenses obtained by injection molding, compression molding or casting these copolymers to the desired lens shape or into a lens button or blank from which a lens may be shaped.

The invention will be best understood by reference to the prior art.

The closest prior art known consists of the copolymers and articles of manufacture described in U.S. Pat. No. 3,808,178 to Gaylord, issued Apr. 30, 1974, entitled "Oxygen-Permeable Contact Lens Composition, Method and Article of Manufacture" later relinquished. Contact lenses fabricated from compositions such as those described in the Gaylord patent are marketed commercially under the trademark "Polycon ®". The copolymers described in the Gaylord patent are copolymers of polysiloxanyl acrylic esters and an alkyl acrylic ester. Gaylord also discloses that other comonomers can be employed to improve certain physical properties of his copolymers, such as acrylic or methacrylic acid to improve the wettability of the copolymer, and ethylene glycol dimethacrylate, a crosslinking comonomer, to improve the rigidity of the copolymer.

Other known hard oxygen-permeable contact lens copolymers of silicones and acrylic esters are disclosed in the U.S. patents to Ellis et al., U.S. Pat. No. 4,168,122 (known in the industry as the "Boston Polymer") and U.S. Pat. No. 4,152,508; and in the U.S. patents to Novicky, U.S. Pat. No. 4,216,303 (known in the industry as the Sil-O$_2$-Flex TM polymer) and U.S. Pat. No. 4,242,483.

The Ellis patents disclose contact lens copolymers of acrylic esters, siloxanylalkyl esters, an itaconate mono or diester, a crosslinking agent such as ethylene glycol dimethacrylate, and a hydrophilic monomer such as 2-hydroxyethyl methacrylate. Ionic charges are established on the surfaces of lenses fabricated from these compositions by treating the lenses with a solution which forms a hydrophilic polyelectrolyte hydrogel complex on the surface of the lens.

The Novicky copolymers are generally similar to the Gaylord and Ellis copolymers but employ generally much more highly branched silicone comonomers.

Additional information regarding the history and development of such lenses is found in the Background discussion appearing in U.S. Pat. No. 4,259,467 which issued on Mar. 31, 1981 and in the several references cited therein.

While the contact lens copolymers of the present invention bear similarities to the Gaylord, Ellis and Novicky copolymers (in that they are copolymers of alkyl acrylic esters with acrylic silane esters), they differ significantly in that the comonomers of the present invention include an acryloxyalkylsilanol or a methacryloxyalkylsilanol and a di(acryloxyalkyl)polysiloxane or a di(methacryloxyalkyl)polysiloxane as essential components. For purposes of this specification it is to be understood that the term "acryloxyalkyl" includes methacryloxyalkyl and the term "acrylic" includes methacrylic. In addition, the silane monomers disclosed by Gaylord, Ellis and Novicky for optional property enhancement are compatible with and therefor may be incorporated into my copolymer, if desired, but they are not required.

The presence of an acryloxymethylsilanol and a dimethacrylpolysiloxane in the copolymer mixture in combination with an alkylsiloxyacrylate or methacrylate and an alkyl ester of acrylic or methacrylic acid yields a copolymer which has distinctly improved wettability and mechanical stability, and one which enables one to manufacture contact lenses, or buttons therefor, by those industry-standard techniques known in connection with the manufacture of PMMA lenses, and enables one to care for and clean the lenses fabricated therefrom with standard hard and soft contact lens cleaning solutions. The mechanical stability of my copolymer also provides lenses having improved stability of lens curvature which affects focus distance and sharpness. No surface treatment is required to improve lens wettability and no special cleaning solutions are required to maintain surface properties.

In general, the contact lens copolymer compositions (by weight percent) of the present invention are formed by copolymerizing comonomers which include 1 to 25% of an acryloxyalkylsilanol; 0.5 to 15% of a dimethacrylpolysiloxane; 5 to 60% of an alkylsiloxy substituted ester of acrylic or methacrylic acid; and from 35 to 90% of alkanol ester of acrylic or methacrylic acid.

The acryloxyalkylsilanols which are essential comonomers in forming the copolymer of the present invention are of the generalized structure:

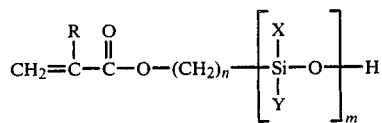

Wherein:
R=CH$_3$— or H—;
X,Y=C$_1$-C$_6$ alkyl, phenyl, or Z;

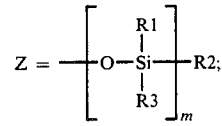

n=1–5;
m=1–3;
R1=C$_1$-C$_6$ alkyl, or phenyl;
R2=C$_1$-C$_6$ alkyl, or phenyl; and
R3=C$_1$-C$_6$ alkyl, or phenyl.

Representative acryloxyalkylsilanols of this type include:
bis(trimethylsiloxy)-γ-methacryloxypropylsilanol;
methyl(trimethylsiloxy)-methacryloxymethylsilanol;
methyl(trimethylsiloxy)-β-methacryloxyethylsilanol;
methyl(trimethylsiloxy)-γ-methacryloxypropylsilanol;
bis(trimethylsiloxy)-β-methacryloxyethylsilanol;
bis(trimethylsiloxy)-methacryloxymethylsilanol;
(trimethylsiloxy)-(pentamethyldisiloxanyl)-methacryloxymethylsilanol;
(trimethylsiloxy)-(pentamethyldisiloxanyl)-β-methacryloxyethylsilanol;
(trimethylsiloxy)-(pentamethyldisiloxanyl)-γ-methacryloxypropylsilanol The polysiloxane diesters used in this invention have the general structure:

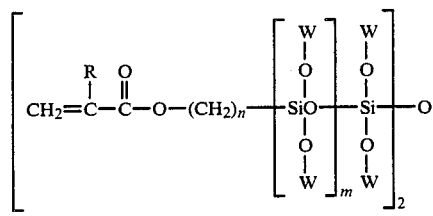

Wherein:
R=CH$_3$— or H—
m=0–3
n=1–5

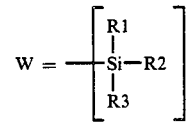

R1=C$_1$-C$_6$ alkyl, or phenyl;
R2=C$_1$-C$_6$ alkyl, or phenyl; and
R3=C$_1$-C$_6$ alkyl, or phenyl.

Representative polysiloxane dimethacrylates are:

1,3-bis(methacryloxypropyl)-1,1,3,3,tetrakis(trimethylsiloxy)-disiloxane;
1,3-bis(acryloxymethyl)-1,1,3,3,tetrakis(trimethylsiloxy)-disiloxane;
1,3-bis(methacryloxypropyl)-1,1,3,3,tetrakis(triethylsiloxy)-disiloxane; and
1,5-bis(methacryloxymethyl)-1,1,3,3,5,5,hexa(trimethylsiloxy)-trisiloxane.

The alkylsiloxy substituted esters have the general structure:

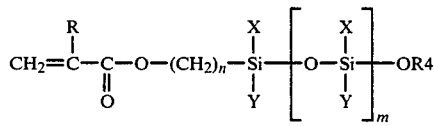

Wherein
R=CH$_3$— or H—;
X=C$_1$-C$_6$ alkyl, phenyl or Z;
Y=C$_1$-C$_6$ alkyl, phenyl or Z;

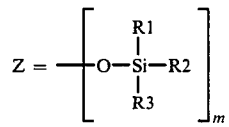

---
R1 = C$_1$-C$_6$ alkyl, or phenyl; m = 0-3;
R2 = C$_1$-C$_6$ alkyl, or phenyl; n = 1-5;
R3 = C$_1$-C$_6$ alkyl, or phenyl; and
R4 = C$_1$-C$_6$ alkyl.
---

Representative alkylsiloxy substituted esters are:
γ-methacryloxypropyl-tris(trimethylsiloxy)silane;
γ-acryloxypropyl-tris(trimethylsiloxy)silane; and
5-methacryloxypropyl-1,1,1-trimethyl-3,3,5,5,tetrakis(trimethylsiloxy)trisiloxane.

The C$_1$-C$_{20}$ alkyl esters of acrylic or methacrylic acid which are useful as comonomers in forming the copolymer of the present invention include: methyl acrylate and methyl methacrylate; ethyl acrylate and ethyl methacrylate; propyl acrylate and propyl methacrylate; isopropyl acrylate and isopropyl methacrylate; butyl acrylate and butyl methacrylate; amyl acrylate and amyl methacrylate; hexyl acrylate and hexyl methacrylate; heptyl acrylate and heptyl methacrylate; octyl acrylate and octyl methacrylate; 2-ethylhexyl acrylate and 2-ethylhexyl methacrylate; nonyl acrylate and nonyl methacrylate; decyl acrylate and decyl methacrylate; undecyl acrylate and undecyl methacrylate; lauryl acrylate and lauryl methacrylate; cetyl acrylate and cetyl methacrylate; octadecyl acrylate and octadecyl methacrylate; and cyclohexyl methacrylate and cyclohexyl acrylate.

The copolymers of the invention are prepared by mixing comonomers with a catalyst/initiator. My preferred initiator is a free-radical-generating-polymerization-initiator of the type commonly used in polymerizing ethenyl functioning unsaturated compounds. Representative free radical polymerization initiators include: acetyl peroxide; lauroyl peroxide; decanoyl peroxide; caprylyl peroxide; benzoyl peroxide; tertiary-butyl peroxypivalate;
diisopropyl peroxycarbonate; tertiary-butyl peroctoate; α,α'-azobisisobutyronitrile; methyl ethyl ketone peroxide;
di(2-phenoxyethyl)peroxydicarbonate; and
di(2-phenoxyethyl)methyl ethyl ketone peroxide.

Conventional polymerization techniques are employed to produce the novel copolymers. The comonomer mixture containing between about 0.05-2% by weight of the free radical initiator is heated to a temperature between 30° C.-100° C., preferably below 70° C., to initiate and complete the polymerization.

The polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from vinyl functioning unsaturated monomers (—CH=CH$_2$), that is, ethenyl-functioning monomers. The copolymer thus produced may be pressed or molded into rods, sheets or other convenient shapes which are then cut into buttons and thereafter machined to produce the contact lenses. Alternatively, the copolymer can be directly cast or molded into finished contact lenses or lens blanks with convex or concave surfaces.

In a preferred practice of the present invention, the monomer mixture is thermally polymerized in an appropriate mold or vessel to provide a block, sheet, rod, or plug, each of which may have a radius convex or radius concave or a plano surface, to provide a semifinished or finished contact lens or other optical lens. The mold and vessel utilized will be formed of polypropylene, polyethylene, nylon, Teflon ®, glass, or aluminum having its mold surface coated with Teflon ®. As will hereinafter appear, certain applications are well served using glass test tubes or rods as the forming mold.

If the wettability of the copolymers described above is lower than desired, this property can be improved by the addition to the copolymerization mixture of from about 1-20 parts by weight of a hydrophilic monomer. Such monomers include hydroxyalkyl acrylates and methacrylates wherein the alkyl group contains about 1 to 4 carbon atoms, acrylic and methacrylic acid, acrylamide, methacrylamide, N-methylolacrylamide, N-methylolmethacrylamide, glycidyl acrylate and methacrylate, and N-vinyl-pyrrolidone. The hydrophilic monomer content of the copolymerization mixture is preferably about 2 to about 14 percent by weight.

The resistance of contact lenses fabricated from the copolymer of the present invention to lens flexure and warpage may be increased, if desired, by the incorporation into the copolymerization mixture of about 0.1 to about 12 percent by weight of an acrylic ester of a C$_1$-C$_{20}$ alkyl polyol such as, for example, ethylene glycol dimethacrylate, butylene glycol dimethacrylate, neopentyl glycol diacrylate and pentaerythritol triacrylate or tetraacrylate.

The principal function of the silanol moiety of the copolymer of the present invention is to improve the mechanical properties of conventional PMMA contact lens polymers. It appears that the inclusion of the silanol as one of the comonomers in the polymerization mixture chiefly affects the warpage characteristics of the copolymer which, in turn, as previously noted, determines the stability of lens curvature which controls focus distance and sharpness. In addition, the silanol moiety of the copolymer imparts significantly improved oxygen permeability and wettability. Consequently, although the silanol component of the copolymerization mixture may be varied within the 1-25 percent by weight as set forth above, the preferred combination of mechanical and oxygen-permeability properties and wettability is achieved by employing about 1-10 percent by weight of the silanol in the copolymerization mixture.

In order to achieve the optimum physical properties of the copolymers of the present invention, it is essential to incorporate from about one (1) to ten (10) percent by weight of the dimethacrylpolysiloxane in the copolymerization mixture. Superior results have been achieved when from about two (2) up to ten (10) weight percent of a dimethacrylpolysiloxane is included in the mixture. This type of comonomer makes possible the introduction of polysiloxane crosslinks as well as pendant groups having methacryl and polysiloxane moieties. Such crosslinks and pendant groups enhance such important properties as oxygen permeability and dimensional stability, which obtains greater visual acuity and enhanced durability in the final lens. Accordingly, the incorporation of a dimethacrylpolysiloxane in the monomer mixture contributes essential properties to novel contact lens materials of this invention.

Within the foregoing limitations, the proportion of $C_1-C_6$ alkyl esters of acrylic or methacrylic acids in the copolymerization mixture is, correspondingly, preferably twenty-five to sixty percent by weight.

The particular free radical polymerization initiator employed in accordance with the preferred practice of the invention is selected by reference to the required initiation temperature. Thus, if conventional polymerization techniques are employed to produce cast rods or other shapes which are then machined to produce the contact lenses, the preferred initiators are $\alpha,\alpha'$-azobisisobutyronitrile, benzoyl peroxide, di(2-phenoxyethyl)peroxydicarbonate, and the like.

On the other hand, if it is desired to produce contact lenses or contact lens blanks by injection molding or direct casting, then a polymerization initiator having a higher intiation temperature would be employed in order to prevent premature polymerization in the injection molding or casting cavities. Such an initiator can be a mixture of methyl ethyl ketone peroxide and cobalt naphthanate.

In one practice of the present invention, a copolymerization mixture is prepared by mixing the following comonomers, in the relative weight ratios indicated, in a plastic container equipped with a conventional stirring and blending device.

A mixture containing a hydroxysilane ester selected from the group consisting of:
bis(trimethylsiloxy)-γ-methacryloxypropylsilanol;
methyl(trimethylsiloxy)methacryloxymethylsilanol;
methyl(trimethylsiloxy)-β-methacryloxyethylsilanol;
methyl(trimethylsiloxy)-γ-methacryloxypropylsilanol;
bis(trimethylsiloxy)-β-methacryloxyethylsilanol;
bis(trimethylsiloxy)-methacryloxymethylsilanol;
(trimethylsiloxy)-(pentamethyldisiloxanyl)-methacryloxymethylsilanol; (trimethylsiloxy)-(pentamethyldisiloxanyl)-methacryloxymethylsilanol, and (trimethylsiloxy)-(pentamethyldisiloxanyl)-γ-methacryloxypropylsilanol; a polysiloxane diester selected from the group consisting of:
1,3-bis(methacryloxypropyl)-1,1,3,3,tetrakis(trimethylsiloxy)disiloxane;
1,3-bis(acryloxymethyl)-1,1,3,3,tetrakis(trimethylsiloxy)disiloxane;
1,3-bis(methacryloxypropyl)-1,1,3,3,tetrakis(triethylsiloxy)disiloxane; and
1,5-bis(methacryloxymethyl)-1,1,3,3,5,5,hexa(trimethylsiloxy)trisiloxane; an alkylsiloxy substituted ester selected from the group consisting of:
γ-methacryloxypropyl-tris(trimethylsiloxy)silane;
γ-acryloxypropyl-tris(trimethylsiloxy)silane; and
5-methacryloxypropyl-1,1,1-trimethyl-3,3,5,5,-tetrakis(trimethylsiloxy)trisiloxane; an alkyl or cycloalkyl ester of acrylic or methacrylic acid in which said alkyl or cycloalkyl has 1-20 carbon atoms; a wetting agent; a polyol-polyacrylate crosslinker and a catalyst/initiator.

The copolymerization mixture will preferably contain from about 1-10 percent by weight of the silanol; from 25-60 percent by weight of $C_1-C_{20}$ alkyl ester of acrylic or methacrylic acid; from 10 to about 60 percent by weight of an alkylsiloxy substituted ester; from 1 to about 10 percent by weight of a polysiloxane diester; from 2 to 15 percent by weight of a wetting agent; from about 3 to about 8 percent by weight of a polyol diacrylate crosslinker; and about 0.1 to about 1.0 percent by weight of catalyst/initiator.

The mixture, when stirred for about 20 minutes, is readily pourable into a preselected mold which may be constructed of polypropylene, polyethylene, nylon, Teflon ®, glass or aluminum having a molding surface coated with Teflon ®. The mold when filled with the copolymerization mixture is placed into a water or silicone bath which in turn is placed into a vacuum oven.

Alternatively, the resulting and readily pourable copolymerization mixture can be converted into a solid of the desired shape by pouring into a Teflon-coated aluminum tube. In any case, the selected mold will have been thoroughly cleaned, as with a dry brush and an anti-static air gun, to remove all particulates therefrom.

The filled molds are then placed in a water or silicone bath which in turn is placed into the oven. A very slight nitrogen flow is maintained through the oven.

The oven, containing the filled molds in the nitrogen environment, is heated to 40°-50° C. to commence polymerization of the copolymer and this temperature is maintained for a period of from 12 to 48 hours at which time the oven temperature is raised to 60°-70° C. for an additional 18 to 48 hours to complete polymerization. When heating at 60°-70° C. is completed, the oven is cooled to room temperature and the copolymer solids, e.g., rods are removed from their molds (the polymerization tubes) by gently tapping the bottom of each tube.

The copolymer rods, thus removed from their respective molds, are annealed by placing them upon suitable trays which are then placed in the oven.

The oven is then evacuated to approximately 5 mm Hg and the oven is heated to a temperature in the range of from 100° to about 150° C. for a period of from about 8 to about 36 hours. The duration of the annealing process is inversely related to the temperature selected.

After heating for the desired time, the oven is cooled to ambient temperature at which time atmospheric air is slowly admitted into the oven until the oven interior reaches atmospheric pressure.

When the oven is thus cooled and the pressure balanced, the trays containing the annealed rods are removed from the oven and the rods are collected.

The rods are then machined to the desired diametric dimension of about ½ inch (13 mm) and then sliced into buttons of approximately 3/16 inch (4 mm) thickness.

It should be noted that the copolymerization mixture can be tinted using any of the physiologically compatible color pigments or dyes currently used in PMMA contact lenses. Additional Food, Drug, and Cosmetic and Drug and Cosmetic dyes that are physiologically compatible can also be used. Thus lenses having blue, grey, green and brown tints as well as clear lenses can be produced by the present invention.

To further aid in the understanding of the present invention but not as a limitation thereupon, reference is made to the following Examples.

EXAMPLE 1

A copolymerization mixture is prepared by mixing the following comonomers in the relative weight ratios indicated in a plastic mixing container and stirring for twenty minutes.

| Comonomers | Parts by weight |
|---|---|
| Bis(trimethylsiloxy)-α-methacryloxypropylsilanol | 6 |
| 1,3-Bis(α-methacryloxypropyl)-1,1,3,3,tetrakis(trimethylsiloxy)-disiloxane; | 4 |
| α-Methacryloxypropyl-tris-(trimethylsiloxy)silane | 30 |
| Methyl Methacrylate | 50 |
| Methacrylic Acid | 5 |
| Ethylene Glycol Dimethacrylate | 5 |
| Initiator | |
| α;α'-azobisisobutyronitrile | 0.2 |

The resulting copolymerization mixture is readily poured into a plurality of thoroughly cleaned tubes, each of which presents a cylindrical mold cavity of approximately 15 mm in diameter and 42 mm in length.

The filled tubes are then placed into a water or silicone bath which is, in turn, placed in an oven. A very slight positive nitrogen flow is maintained through the oven.

The oven containing the molds in the nitrogen environment is then heated to 40°–50° C. for 24–48 hours and thereafter the temperature is increased to 60°–70° C. for an additional 18–36 hours to complete polymerization. The oven is thereafter cooled to room temperature and the copolymer rods are removed from the molds.

The copolymer rods are annealed by placing them flat in trays which are placed into the vacuum oven. The oven is then evacuated to approximately 5 mm Hg and the oven is heated to 100°–150° C. for 8–36 hours according to Table A-2 below.

TABLE A-2

| Temperature (°C.) | Duration (hours) |
|---|---|
| 100 | 36.0 |
| 105 | 33.2 |
| 110 | 30.4 |
| 115 | 27.6 |
| 120 | 24.8 |
| 125 | 22.0 |
| 130 | 19.2 |
| 135 | 16.4 |
| 140 | 13.6 |

TABLE A-2-continued

| Temperature (°C.) | Duration (hours) |
|---|---|
| 145 | 10.8 |
| 150 | 8.0 |

The oven is then cooled to ambient temperature at which time atmosphere air is slowly admitted into the oven until the oven interior reaches atmospheric pressure. The trays containing the annealed rods are then removed from the oven and the rods are collected. Each rod is then machined to the desired diametric dimension, about 13 mm, and thereafter sliced into a plurality of buttons (lens blanks), each being approximately 4 mm thick.

EXAMPLE 2

Standard Method for Determining Wetting Angle

Ten contact lens buttons (approximately 13 mm in diameter and 4 mm thick) are prepared by slicing one of the copolymer rods produced according to Example 1, "facing" one flat surface of each button with a diamond turning tool and polishing the faced surface to the degree normally acceptable by contact lens standards. After immersing the buttons in a contact lens soaking solution such as benzalkonium chloride (available as SOCLENS ® from Alcon) or the like for 24 hours, each button is thoroughly washed with distilled water, blotted dry, and then thoroughly dried under vacuum in a 40° C. oven for one week. After this preparation, the buttons are subjected to wetting angle determinations as described in the "Standard Method for Determining Wetting Angle" issued by the Contact Lens Manufacturers Association, Chicago, Ill., dated Apr. 10, 1978. Note that the smaller the "wetting angle" (in degrees), the better the tear pump exchange. The results obtained for the ten buttons of this example are reported in Table B, below.

TABLE B

| Button No. | Wetting Angle (Degrees) | Standard Deviation (±°) |
|---|---|---|
| 1 | 30. | 2.0 |
| 2 | 23.3 | 2.0 |
| 3 | 23.7 | 1.5 |
| 4 | 22.0 | 3.0 |
| 5 | 23.3 | 1.5 |
| 6 | 21.0 | 2.0 |
| 7 | 22.7 | 2.3 |
| 8 | 21.0 | 1.0 |
| 9 | 21.0 | 0.0 |
| 10 | 23.0 | 1.0 |

These data give an average wetting angle of 23.1° with a standard deviation of ±1.63°.

EXAMPLE 3

For comparison, the wetting angles of other commercially available contact lens polymers and copolymers were determined utilizing the same procedure as described in Example 2. The results are reported in Table C, below:

TABLE C

| Polymer | Wetting Angle Degrees | Standard Deviation (± Degrees) |
|---|---|---|
| PARAGON 18 (Paragon) | 18.3 | 0.49 |
| PMMA #2 (Glassflex TM) | 25.6 | 1.77 |
| PMMA #4 (Glassflex TM) | 24.3 | 3.8 |

TABLE C-continued

| Polymer | Wetting Angle Degrees | Standard Deviation (± Degrees) |
|---|---|---|
| Polycon ® (Gaylord-Syntex) | 30.4 | .77 |
| Sil-O$_2$-Flex ® (Novicky) | 25.4 | — |
| Boston (Ellis) (Polymer Tech) | 33.3 | — |
| PARAGON 95 | 20.4 | — |

EXAMPLE 4

The contact lens copolymers of Examples 2 and 3 were tested for oxygen-permeability with a Schema-Versatae machine. The results are reported in Table D, below:

TABLE D

| Polymer | O$_2$ Permeability (DK × 10$^{-11}$)* |
|---|---|
| PARAGON 95 | <1 |
| PARAGON 18 | <1 |
| PMMA #2 (Glassflex ™) | <1 |
| PMMA #4 (Glassflex ™) | <1 |
| Polycon ® (Gaylord-Syntex) | 3.8 |
| Sil-O$_2$—Flex ® (Novicky) | 7.5 |
| Boston (Ellis) (Polymer Tech) | 11.1 |
| Example 1 | 12.2 |

*(CM$^2$/sec) (ml O$_2$/ml × mm Hg)

EXAMPLES 5–13

Following the general procedure as described in Example 1, copolymers are prepared which, depending on the specific application, have a desired combination of mechanical strength, dimensional stability, optical clarity, oxygen permeability and wettability for use in fabricating contact lenses.

TABLE E

| Comonomer | Parts by weight in copolymerization mixture Example | | | | | | | | |
|---|---|---|---|---|---|---|---|---|---|
| | 5 | 6 | 7 | 8 | 9 | 10 | 11 | 12 | 13 |
| Bis(trimethylsiloxy)-α-methacryloxypropylsilanol | 6 | 4 | 6 | 8 | 10 | 1 | 25 | 1 | 5 |
| α-Methacryloxypropyl-tris-(trimethylsiloxy)-silane | 40 | 30 | 25 | 18 | 10 | 60 | 15 | 5 | 32 |
| 1,3-Bis(α-methacryloxypropyl)-1,1,3,3,tetrakis-(trimethylsiloxy)-disiloxane | 10 | 6 | 1 | 2 | 2 | 0.5 | 5 | 3 | 15 |
| Methyl Methacrylate | 35 | 46 | 51 | 60 | 60 | 35 | 48 | 90 | 40 |
| Methacrylic Acid | 6 | 8 | 5 | 4 | 14 | 1 | 2 | 0 | 8 |
| Ethylene Glycol Dimethacrylate | 3 | 6 | 12 | 8 | 4 | 2.5 | 5 | 1 | 0 |
| Initiatior | | | | | | | | | |
| α,α' Azobisisobutynonitrile | 0.2 | 0.4 | — | — | — | 0.1 | 0.2 | — | 0.2 |
| Benzoyl Peroxide | — | — | 0.2 | — | — | — | — | 0.5 | — |
| Methyl Ethyl Ketone Peroxide and Cobalt Naphthenate Mixture | — | — | — | 0.2 | 0.2 | — | — | — | — |

Following the general procedures of Example 1, copolymers are prepared of other comonomers, which, depending on the specific desired balance of properties of mechanical strength, dimensional stability, resistance to warpage, optical characteristics, oxygen permeability and wettability, are suitable for use in fabricating contact lenses according to the present invention.

Referring to examples 5–13, the following substitutions can be made for all or part of the indicated monomers without departing from the present invention.

Bis(trimethylsiloxy)-methacryloxymethylsilanol or methyl-(trimethylsiloxy)-γ-methacryloxypropyl-silanol for bis-(trimethylsiloxy)-γ-methacryloxypropylsilanol;

methacryloxymethyl-tris-(trimethylsiloxy)silane or γ-acryloxymethyl-tris-(triethylsiloxy)silane for γ-methacryloxypropyl-tris-(trimethylsiloxy)silane;

1,3-bis(methacryloxymethyl)-1,1,3,3,tetrakis(trimethylsiloxy)disiloxane or 1,3-bis-(γ-methacryloxypropyl-1,1-dimethyl-3,3-bis-trimethylsiloxy-disiloxane for 1,3-bis(γ-methacryloxypropyl)-1,1,3,3,tetrakis(trimethylsiloxy)disiloxane; methyl acrylate, ethyl methacrylate or 2-ethoxyethyl methacrylate for methyl methacrylate; acrylic acid, acrylamide or 2-hydroxyethyl methacrylate for methacrylic acid; and 1,3-propylene diacrylate or tetraethylene glycol dimethacrylate for ethylene glycol dimethacrylate.

Various acceptable alternative initiators has been disclosed earlier with preferred initiators shown in the last six lines of Table E.

EXAMPLE 14

The copolymers of Examples 8 and 9 were found suitable for production of contact lens buttons and contact lenses by injection molding using state of the art machines. For example, these copolymers can be injection molded to form convex or concave surfaced contact lens blank (buttons) or to form contact lenses using the process parameters shown below.

TABLE F

| Mold Temperature | 100° C.–160° C. |
|---|---|
| Injection Pressure | 600 psi–2500 psi |
| Hold Pressure | 50 psi–500 psi |
| Hold Time | 2 sec.–120 sec. |
| Injection Time | 1 sec.–5 sec. |

EXAMPLE 15

The copolymer formulations of Examples 7, 8, and 9 were found suitable for the production of contact lens buttons and contact lens by compression molding using state of the art equipment. Thus, these copolymers can be compression molded to form concave or convex surfaced contact lens buttons or to form contact lenses using the parameters shown below.

TABLE G

| Mold Temperature | 100–160° C. |
|---|---|
| Compression pressure | 25–250 psi |
| Hold time | 2–120 seconds |

EXAMPLE 16

The copolymer formulations of Examples 1 and 5–13 were formulated into lenses and subjected to FDA microbiological testing for toxicity and physiological biocompatibility. All speciments met FDA standards for human use.

From the foregoing, it becomes apparent that a new and useful copolymer composition, method for handling said copolymers to mold or cast them into optical lenses or blanks from which contact lenses may be shaped, and the buttons and lenses resulting therefrom have been herein described and illustrated which fulfill all of the aforesaid objectives in a remarkably unexpected fashion, it being understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. A copolymer composition, especially suited for fabricating optical lenses, comprising a copolymer of copolymerized comonomers containing:

(a) about one to about twenty-five percent by weight of an acryloxyalkylsilanol having the structure

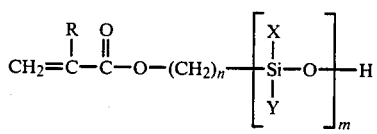

wherein
   R=CH$_3$— or H—;
   X, Y=C$_1$-C$_6$ alkyl; phenyl or Z

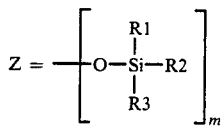

n=1-5;
   m=1-3
   R1=C$_1$-C$_6$ alkyl, or phenyl
   R2=C$_1$-C$_6$ alkyl, or phenyl
   R3=C$_1$-C$_6$ alkyl, or phenyl (b) about 0.5 to about fifteen percent by weight of a polyacryloxyalkylpolysiloxane having the structure

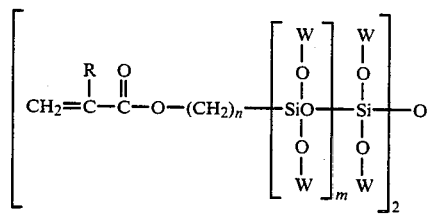

Wherein:
   R=CH$_3$— or H—;
   m=0-3
   n=1-5

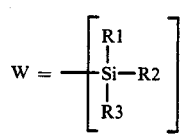

R1=C$_1$-C$_6$ alkyl, or phenyl;
   R2=C$_1$-C$_6$ alkyl, or phenyl; and
   R3=C$_1$-C$_6$ alkyl, or phenyl;

(c) about 5 to about 60 percent by weight of a siloxy substituted ester of acrylic or methacrylic acid having the structure:

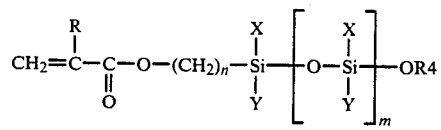

Wherein
   R=CH$_3$— or H—;
   X=C$_1$-C$_6$ alkyl, phenyl or Z
   Y=C$_1$-C$_6$ alkyl, phenyl or Z

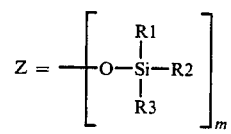

R1 = C$_1$-C$_6$ alkyl, or phenyl        m = 0-3
   R2 = C$_1$-C$_6$ alkyl, or phenyl        n = 1-5
   R3 = C$_1$-C$_6$ alkyl, or phenyl
   R4 = C$_1$-C$_6$ alkyl;

and (d) about 35 to about 90 percent by weight of an acrylic or methacrylic ester of an alkanol having from one to 20 carbon atoms.

2. A composition according to claim 1 in which an additional crosslinking monomer is incorporated into said copolymer of copolymerized comonomers.

3. A composition according to claim 2 in which said additional crosslinking monomer is an acrylic ester of a C$_1$-C$_{20}$ alkyl polyol.

4. The composition according to claim 3 in which said additional crosslinking monomer is present in an amount equal to about one percent to about twelve percent by weight of said copolymer.

5. The composition according to claim 4 in which said crosslinking monomer is selected from the group consisting of ethylene glycoldimethacrylate and butylene glycoldimethacrylate.

6. A composition according to claim 2 in which a hydrophilic monomer is incorporated into said copolymer of comonomers.

7. A composition according to claim 6 in which said hydrophilic monomer is present in an amount equal to about two percent to about fourteen percent by weight of said copolymer.

8. A composition according to claim 2 in which a hydrophilic monomer is incorporated into said copolymer of comonomers in an amount equal to about two percent to about fourteen percent by weight of said copolymer, said hydrophilic monomer being selected from the group consisting of methacrylic acid, acrylic acid and acrylamide.

9. A composition according to claim 1 in which a hydrophilic monomer is incorporated into said copolymer of copolymerized comonomers.

10. A composition according to claim 9 in which said hydrophilic monomer is present in an amount equal to about two percent to about twelve percent by weight of said copolymer.

11. A composition according to claim 1 in which a hydrophilic monomer is incorporated into said copolymer of copolymerized comonomers in an amount equal to about two percent to about twelve percent by weight of said copolymer, said hydrophilic monomer being selected from the group consisting of methacrylic acid, acrylic acid and acrylamide.

12. A composition according to claim 2 in which an initiator is incorporated into said comonomer mixture prior to polymerization.

13. A composition according to claim 12 in which said initiator is present in an amount equal to about 0.1 to about 1.0 percent by weight of said comonomer mixture.

14. A composition according to claim 13 in which said initiator is selected from the group consisting of di(2-phenyloxyethyl)peroxy dicarbonate, $\alpha,\alpha'$-azobisiso-butyronitrile, and a mixture of methyl ethyl ketone peroxide and cobalt naphthenate.

15. A composition according to claim 9 in which an initiator is incorporated into said comonomer mixture prior to polymerization.

16. A composition according to claim 15 in which said initiator is present in an amount equal to about 0.1 to about 1.0 percent by weight of said comonomer mixture.

17. A composition according to claim 16 in which said initiator is selected from the group consisting of di(2-phenyloxyethyl)peroxy dicarbonate, $\alpha,\alpha'$-azobisiso-butyronitrile, and a mixture of methyl ethyl ketone peroxide and cobalt naphthenate.

18. A composition according to claim 1 containing as comonomers prior to polymerization from about 2 to about 8 percent by weight of a hydrophilic monomer selected from the group consisting of methacrylic acid, acrylic acid and acrylamide; from about 3 to about 8 percent by weight of a crosslinker selected from the group consisting of ethylene glycol dimethacrylate and butylene glycol dimethacrylate; and from 0.1 to about 0.5 percent by weight of an initiator selected from the group consisting of di(2-phenyloxyethyl)-peroxy dicarbonate; $\alpha,\alpha'$-azobisisobutyronitrile, and a mixture of methyl ethyl ketone peroxide and cobalt naphthenate.

19. A composition according to claim 18 in which said initiator is a mixture of methyl ethyl ketone peroxide and cobalt naphthenate.

20. A composition according to claim 18 in which said initiator is $\alpha,\alpha'$-azobisisobutyronitrile.

21. A composition according to claim 18 in which said crosslinker is ethylene glycol dimethacrylate.

22. As a new article of manufacture, an optical lens fabricated from the copolymer of copolymerized comonomers of claim 1.

23. An article of manufacture according to claim 22 comprising a contact lens.

24. As a new article of manufacture, a contact lens button fabricated from the copolymer of copolymerized comonomers of claim 1.

25. As a new article of manufacture, a contact lens formed from the button of claim 24.

\* \* \* \* \*